US010841342B2

(12) United States Patent
Rykowski et al.

(10) Patent No.: US 10,841,342 B2
(45) Date of Patent: *Nov. 17, 2020

(54) DATA DRIVEN USER INTERFACES FOR DEVICE MANAGEMENT

(71) Applicant: VMware, Inc., Palo Alto, CA (US)

(72) Inventors: Adam Stephen Rykowski, Atlanta, GA (US); Adarsh Subhash Chandra Jain, Atlanta, GA (US); Kai Chen, Marietta, GA (US); Daniel Quintas, Atlanta, GA (US); Huda Osman, Atlanta, GA (US)

(73) Assignee: VMware, Inc., Palo Alto, CA (US)

( * ) Notice: Subject to any disclaimer, the term of this patent is extended or adjusted under 35 U.S.C. 154(b) by 226 days.

This patent is subject to a terminal disclaimer.

(21) Appl. No.: 15/865,872

(22) Filed: Jan. 9, 2018

(65) Prior Publication Data

US 2019/0215343 A1 Jul. 11, 2019

(51) Int. Cl.
*H04L 29/06* (2006.01)
*G06F 3/048* (2013.01)
*H04L 29/08* (2006.01)

(52) U.S. Cl.
CPC .......... *H04L 63/205* (2013.01); *G06F 3/048* (2013.01); *H04L 63/08* (2013.01); *H04L 63/101* (2013.01); *H04L 67/303* (2013.01); *H04L 67/36* (2013.01)

(58) Field of Classification Search
CPC ..... H04L 63/205; H04L 63/101; H04L 63/08; H04L 67/303; H04L 67/36; G06F 3/048
See application file for complete search history.

(56) References Cited

U.S. PATENT DOCUMENTS

| 8,849,978 B1* | 9/2014 | Batson ................... H04L 67/10 709/223 |
| 9,311,284 B2 | 4/2016 | Warila et al. |
| 2004/0111428 A1 | 6/2004 | Rajan et al. |
| 2006/0161646 A1 | 7/2006 | Chene et al. |
| 2007/0150820 A1* | 6/2007 | Salvo ........................ G06F 8/38 715/760 |

(Continued)

OTHER PUBLICATIONS

International Search Report mailed for Application No. PCT/US2019/012575.
Office Action mailed for U.S. Appl. No. 15/865,885.

*Primary Examiner* — Hee K Song
(74) *Attorney, Agent, or Firm* — Thomas Horstemeyer, LLP

(57) ABSTRACT

Disclosed are various embodiments that related to rendering a data driven user interface used to configure device profiles in an enterprise device management environment. In some examples, the enterprise device management environment can include a platform messaging service and a platform specific adapter. In one example, a system can receive a request to generate a device profile for a platform. The system can render a data driven user interface for configuring the device profile based on a definition file. The system can also receive input of a value for a user interface element and retrieve the values from the other user interface elements. The system can generate the device profile based on a translation of the values and transmit a command to a platform messaging service to facilitate an installation of the device profile in a mobile device.
Various delivery methods for installing the device profile are disclosed.

20 Claims, 8 Drawing Sheets

(56) References Cited

U.S. PATENT DOCUMENTS

| | | |
|---|---|---|
| 2008/0120557 A1* | 5/2008 | Offenhartz .......... G06F 9/44505 |
| | | 715/760 |
| 2009/0099981 A1 | 4/2009 | Heuler et al. |
| 2009/0193445 A1 | 7/2009 | Thakker |
| 2010/0299376 A1 | 11/2010 | Batchu et al. |
| 2014/0108649 A1* | 4/2014 | Barton ................ G06F 9/45533 |
| | | 709/224 |
| 2014/0235222 A1 | 8/2014 | Gonen et al. |
| 2014/0280975 A1 | 9/2014 | Mordani et al. |
| 2015/0026330 A1 | 1/2015 | Ahmed et al. |
| 2015/0095975 A1 | 4/2015 | Barton et al. |
| 2015/0019528 A1 | 7/2015 | Manton et al. |
| 2016/0057000 A1 | 2/2016 | Piekarski et al. |
| 2016/0094812 A1 | 3/2016 | Chen |
| 2016/0255117 A1 | 9/2016 | Sinha et al. |
| 2016/0321301 A1 | 11/2016 | Wang et al. |
| 2017/0012499 A1 | 5/2017 | Hersh et al. |

\* cited by examiner

DATA DRIVEN USER INTERFACES FOR DEVICE MANAGEMENT

BACKGROUND

With the emergence of the bring your own device (BYOD) culture, users are preferring to perform work-related tasks on their own devices. In this environment, IT administrators are tasked with enforcing security policies of an enterprise on a user's personal device. Further, this task is made more difficult because these enterprise security policies have to be enforced on various different user devices that can operate various software platforms.

Typically, devices such as laptops, tablets, and mobile phones, are required to abide by the enterprise policies. Prior to an employee using his or her own device in the workplace, a company can require the employee to enroll their client device with a management service capable of protecting enterprise data from theft, loss, and unauthorized access. Administrators of the management service can use the management service to oversee operation of the devices enrolled with or otherwise managed by the service. A device can interact with a management service through an enterprise agent. For instance, the enterprise agent can oversee the safe installation and execution of other types of applications, such as word processing applications, spreadsheet applications, or other applications.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

Figure 1A:
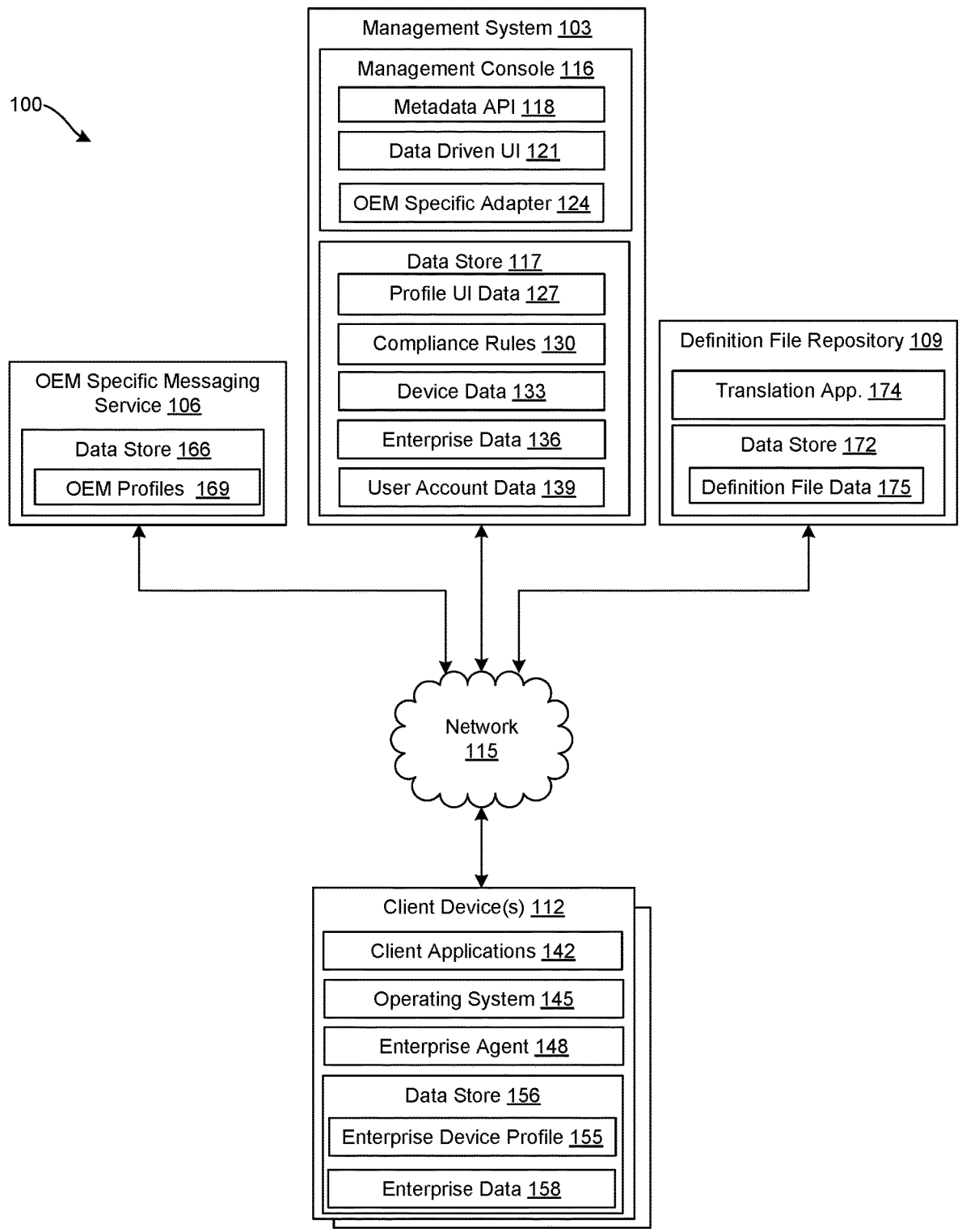
FIG. 1A is a drawing of an example of a networked environment that includes a management system, an OEM specific messaging service, a definition file repository, and a client device.

The present disclosure relates to using data driven user interface techniques in an enterprise management environment. In an enterprise management environment, a management system enforces security policies of the enterprise on user devices, such as smartphones, tablets, laptops, and other suitable mobile devices. In some cases, the user device may be owned by an employee or a contractor. As a result, the administrator can be challenged with protecting enterprise data and applications on a device that is not owned by the company. The management system can be used by an enterprise administrator to control which features of an operating system or an application can be accessed on the user device according to an enterprise security policy. The management system can generate device profiles specific for particular operating system platforms and applications that enable the management of the security policies on the user devices.

Oftentimes, developers of operating systems and applications generate various versions of their software products in order to provide new features and/or settings. Some examples of new features may include new camera capabilities, new Wi-Fi settings, a "Do Not Disturb While Driving" feature, new device tracking capabilities, new messaging applications, and other suitable features that are added to a software platform. In an enterprise management context, a management system can require a software revision in order to enable and/or display new features as being manageable in a user interface for administrators. The software revision can include generating new profile user interfaces that display new user interface elements for enabling or disabling the new features from a new version of a software platform. In other words, in order to support a new feature, profile user interfaces rendered by the management system for the administrator can require an update to accommodate the new feature. Particularly, the profile user interfaces may need additional parameters displayed in order for the administrator to be capable of enabling/disabling settings associated with the new feature.

In prior systems, when the management system loaded a profile user interface or a console user interface, it required retrieving a specific source code file as a basis for generating the profile user interface. The specific source code file may comprise platform-specific code programmed for the targeted platform. In other words, the platform-specific code may not be reusable to support other operating system platforms or other applications. Thus, as new features become available in a new version of an operating system platform, a new specific source code file may be manually programmed and tested before becoming available in a management system for the administrator. Particularly, this may involve manually programming a new HMTL source file, which can be used to generate a new platform-specific profile that supports the new feature of the particular software platform. This problem increases significantly as other original equipment manufacturers (OEM) also produce updates with new features to their platforms. Therefore, an enterprise management developer can spend a significant amount of time on development because of the continuous addition of new features on various software platforms.

Various examples related to using data driven user interface techniques in an enterprise management environment are described herein, particularly for dynamically rendering user interfaces that can be used to generate device profiles without having to manually program platform-specific software. The management system can use a definition file that can serve as a data source for the platform-specific parameters required to support features of a software platform. Each supported feature in the definition file can have one or more platform parameters and can have an assigned unique user interface identifier. The definition file can be used to generate a platform-specific profile. Using data driven user interface techniques, the definition file can be used to dynamically render a profile user interface that includes the minimum platform-specific parameters for each supported feature that require inputs by the administrator. After the administrator provides the inputs, the management system can translate the inputs for the platform-specific parameters into a device profile that comprises platform-specific code. Particularly, the management system can translate the inputs into a platform-specific device profile based on the platform-specific parameters identified in the definition file. From the management system, the platform-specific device profile can be routed to the user device and executed to enforce the various security policies on the user device.

In other words, the platform-specific device profiles can be configured by using dynamically rendered profile user interface, which are viewed and configured by an administrator according to the enterprise security policies established for a particular enterprise. The profile user interface can be dynamically rendered by retrieving the required platform-specific parameters from the definition file. The definition file, such as a metadata text file for example, can be used as a data source for the various platform-specific parameters that need to be configured for each supported feature on the targeted platform. In the definition file, each parameter can be associated with a field type and a unique platform-specific identifier. In one non-limiting example, the unique platform-specific identifier can be unique among all of the various parameters required by the various platforms. In cases where a previous profile user interface was created, the previous profile user interface and a new definition file can be merged to generate a new profile user interface. The merging process can involve extracting existing values, i.e. representing previous user-configured settings, from the previous profile user interface and establishing new parameters that may require input from the administrator in order to enable/disable a new feature or settings of the new version of the operating system.

Further, when the definition file is updated by adding or removing platform-specific parameters, the next rendered instance of the profile user interface can display the updated platform-specific parameters stored in the definition file. In other words, using data driven user interface techniques, an updated profile user interface can be rendered without having to modify code associated with the profile user interface.

In addition, some examples of a managed networked environment involve a distribution of definition files from a networked storage device to a management console application, without having to upgrade the management console application binary. Additionally, some examples involve OEM specific translation techniques for translating the inputs or values retrieved from a profile user interface into an OEM-specific device profile. For example, a first translation technique can be used for generating device profiles for the Chrome OS™ platform, and a second translation technique can be used for generating device profiles for the Windows 10™ platform.

The examples described herein provide several advantages over previous solutions. For instance, the examples reduce the amount of time needed for software development and software testing because the source code associated with profile user interfaces are not manually modified and tested for each new instance of a profile user interface. In other words, new features generated by OEM platforms can be rapidly supported because an appropriate profile user interface does not have to be manually programmed after each new feature is released. The dynamically rendered profile user interfaces can be used to display user interface elements that can receive user-input of a specification on how the feature should be configured when generating the device profile.

With reference to FIG. 1, shown is an example of a networked environment 100. The networked environment 100 can include a management system 103, an OEM specific messaging service 106, a definition file repository 109, and client device(s) 112 in communication with one another over a network 115. The management system 103 can provide an enterprise with access to email, corporate documents, social media, and other enterprise content. The management system 103 can also execute a management console 116 and access a data store 117.

The management system 103 can include a server computer or any other system providing computing capability. Alternatively, the management system 103 can include a plurality of computing devices that are arranged, for example, in one or more server banks, computer banks, or other arrangements. The management system 103 can include a grid computing resource or any other distributed computing arrangement. The computing devices can be located in a single installation or can be distributed among many different geographical locations. The management system 103 can also include or be operated as one or more virtualized computer instances. For purposes of convenience, the management system 103 is referred to in the singular. Even though the management system 103 is referred to in the singular, it is understood that a plurality of management systems 103 can be employed in the various arrangements as described above. The management system 103 can communicate with the client device 112, the OEM specific messaging service 106 and the definition file repository 109 remotely over the network 115.

The management console 116 generates and manages device profiles used to enforce enterprise security policies on user devices. The management console 116 can generate a new device profile by rendering a profile user interface that enables an administrator to set an enterprise policy for a specific operating system platform or for individual applications. In some cases, the management console 116 can also edit an existing device profile to accommodate a new feature or setting for a specific operating system platform. For example, the management console 116 can render a profile user interface that enables an administrator to select whether managed users can access camera and/or microphone features on their devices. In other words, a device profile can restrict a client device, such as mobile device, from using an audio capturing application, an image capturing application, a phone application, a text messaging application, and other suitable hardware and software restrictions. The management console 116 can also include a metadata application programming interface (API) 118, a data driven user interface (UI) 121, and an OEM specific adapter 124.

The metadata API 118 can retrieve the definition file for a specific platform. The metadata API 118 can retrieve the latest definition file from the data store 117. The metadata API 118 can retrieve the definition file in response to receiving a request from the management console 116 to load a profile user interface.

The data driven UI 121 can be used to dynamically render a profile user interface based on the platform-specific parameters included in the definition file. The data driven UI 121 can retrieve an existing profile user interface to extract previous values for platform-specific parameters. These values can be loaded into the profile user interface for the administrator to view the previous security settings. In some cases, the definition file has new platform-specific parameters in order to support a new feature. In this situation, the generated profile user interface will apply the previous values from the previous profile user interface and assign a value of null to the new platform-specific parameters. The management console 116 renders the profile user interface on a display. The administrator can use the profile user interface to select which features should be enabled/disabled. For example, in the situation of a new feature rollout, the administrator can select whether to enable/disable the new feature for the particular platform.

The OEM specific adapter 124 can be used to translate the values, i.e. profile settings, extracted from the profile user interface into a platform-specific device profile that can be executed on the client device 112 of the user. As an example, the OEM specific adapter 124 can be configured to translate extracted values into device profiles for client devices 112 executing one or more operating systems provided by Google®, Microsoft®, Apple®, and other suitable OEM operating system developers. Some example operating systems can include Apple's iOS®, Apple's macOS®, Apple's tvOS®, Microsoft's Windows®, Microsoft's Windows Mobile, Google's Android, Google's Chrom OS™, and other suitable operating systems. After the device profile has been generated, it can be transmitted to the client device 112.

The management system 103 can also include the data store 117. The data store 117 can include memory for the management system 103, mass storage resources of the management system 103, or any other storage resources on which data can be stored by the management system 103. The data store 117 can include one or more databases, such as a structured query language (SQL) database, a non-SQL database, or other appropriate database. The data stored in the data store 117, for example, can be associated with the operation of the various applications, device profiles, data driven user interfaces, profile adapters, or functional entities described below. The data store 117 can include profile user interface data 127, compliance rules 130, device data 133, enterprise data 136, and user account data 139.

The network 115 can include, for example, the Internet, intranets, extranets, wide area networks (WANs), local area networks (LANs), wired networks, wireless networks, other suitable networks, or any combination of two or more such networks. For example, the networks can include satellite networks, cable networks, Ethernet networks, cellular networks, telephony networks, and other types of networks.

In some examples, an enterprise, such as one or more organizations, can operate the management console 116 to oversee or manage the operation of the client devices 112 of its employees, contractors, customers, students, or other users having user accounts with the enterprise. The enterprise or organization can have a hierarchy. A hierarchy can be an organizational structure that links the individuals and/or groups in the enterprise. For example, an individual or group can be responsible for management of one or more subordinate individuals or groups, who can in turn be responsible for management of one or more subordinate individuals or groups, and so on.

The management console 116 can cause various software components to be installed on the client device 112. Such software components can include, for example, client application(s) 142, an operating system 145, an enterprise agent 148, resources, libraries, drivers, or other similar components that require installation on the client device 112 as specified by an administrator of the management console 116. The management console 116 can further cause policies to be implemented on the client device 112 by way of a device profile. Policies can include, for example, restrictions or permissions pertaining to capabilities of a client device 112 such that access to enterprise data is secured on the client device 112.

The management console 116 can interact with one or more client applications 142 executed on the client device 112 to perform management functions. In one example, the management console 116 can interact with an enterprise agent 148 to enroll a client device 112 with the management console 116. When enrolled, the enterprise agent 148 can be registered as a device administrator of the client device 112, which can provide the enterprise agent 148 with sufficient privileges to control the operation of the client device 112. In one example, the enterprise agent 148 can be registered as the device administrator through the installation of a management profile at an operating system 145 that causes the operating system 145 to designate the enterprise agent 148 as the device administrator. In some examples, the enterprise agent 148 can receive instructions from the management system 103 to install the device profile on the client device 112.

The management console 116 can direct the enterprise agent 148 to perform various device management functions on the client device 112. For example, the management console 116 can direct the enterprise agent 148 to control access to certain software or hardware functions available on the client device 112. As a result, the management console 116 can verify that the configuration and operation of the client device 112 is in conformance with predefined criteria that ensures that enterprise data 158 or other data is protected from data loss, unauthorized access, or other harmful events.

The management console 116 further provisions enterprise data 136 to the client device 112 through the enterprise agent 148. In one example, the management console 116 can cause the enterprise agent 148 to control use of the client device 112, or provision enterprise data 136 to the client device 112, through use of a command queue provided by the management console 116. In some examples, the management console 116 can store commands and other suitable content in a command queue associated with a particular client device 112 and can configure the enterprise agent 148 executed by such client device 112 to retrieve the contents of the command queue. In some examples, the command queue can be stored in the data store 117. In one example, the enterprise agent 148 can be configured to retrieve the contents of the command queue on a configured interval, such as every four hours, or upon detection of a certain event, such as an unauthorized application being executed by the client device 112. In some cases, the enterprise agent 148 can instruct the client device 112 to retrieve the content of the command queue by activating a uniform resource locator (URL) link. The management console 116 can also push commands to the enterprise agent 148 over the network 115. In addition, a particular command queue can arranged for a particular client device 112. For example, after a new device profile has been generated for a particular client device 112, the device profile can be stored in a particular command queue associated with the particular client device 112 for retrieval by the client device 112.

In any case, the enterprise agent 148 can receive the contents of the command queue from the management console 116. In one example, the contents of the command queue can include one or more commands for the enterprise agent 148 to execute on the client device 112. In another example, the contents of the command queue can include a resource or a client application 142 that the enterprise agent 148 should cause to be installed on the client device 112, which the client device 112 can access through a specified uniform resource locator (URL).

In some examples, the enterprise agent 148 is omitted from the client device 112. In this scenario, API commands can be sent directly to the operating system of the client device 112 through the OEM specific message service 106. The device profile can be transmitted to the client device 112. Then, an API command can be sent to the operating system 145 of the client device 112 to enable the device profile on the client device 112. This approach is different from previous because the enterprise agent 148 is not used to instruct the operating system 145 to implement the device profile.

The data stored in the data store 117 can include, for example, profile user interface data 127, compliance rules 130, device data 133, enterprise data 136, user account data 139, as well as other data. The profile user interface data 127 can include data related to the definition files for the various software platforms and previous stored settings for a previous generation of a device profile. These device settings can be stored as metadata values.

The compliance rules 130 can include hardware, software, and data access restrictions according to a compliance policy. The compliance policy can be configured by an administrator of an enterprise. In some cases, the data access restrictions can be based on access levels assigned to a user. For example, sensitive data, such as confidential data, may only be accessible for users assigned with a particular access level. In other cases, the department the user works in can determine what data the user can access.

In addition, the compliance rules 130 can also include constraints specified by an administrator for compliance of the client device 112 with the management console 116. In one example, the enterprise agent 148 can configure hardware or software functionality of a client device 112 such that the client device 112 is in conformance with the compliance rules 130. For instance, an administrator can specify whether Bluetooth® functionality, camera functionality, microphone functionality, or other suitable device functionality are permitted on the client device 112. Additionally, the enterprise agent 148 can identify when the client device 112 is not in compliance with the compliance rules 130, as well as other policies, and can take appropriate remedial actions, such as denying access to enterprise data 138, restricting access to particular networks, or enabling or disabling other functionality of the client device 112 of the enterprise agent 148.

The device data 133 can include indications of the state of the client device 112. In one example, these indications can specify applications that are installed on the client device 112, configurations or settings that are applied to the client device 112, user accounts associated with the client device 1015, the physical location of the client device 112, the network to which the client device 112 is connected, and other information describing the current state of the client device 112.

The enterprise data 136 can include email, corporate documents, social media, messages, enterprise applications, confidential documents, and other enterprise content or communications. The management console 116 can be employed to manage and control access to the enterprise data 138 associated with an enterprise. The management console 116 can provide systems and applications with access based on user accounts, user groups, device data 133, compliance rules 130, and other information.

The user account data 139 can include information pertaining to end users of the client devices 112 enrolled with the management console 116. For instance, the user account data 139 can include data used to authenticate an end user, such as a username, password, email address, biometric data, device identifier, registry identifier, or other data. Additionally, the user account data 139 can include other information associated with an end user, such as name, organization unit, or other information. Each user account can be associated with a particular entity, such as an enterprise, employer, or other entity.

The OEM specific messaging service 106 or a platform specific message service can represent a specific delivery mechanism for transmitting the platform-specific device profiles to the client device 112. The OEM specific messaging service 106 can include a data store 166, which stores OEM device profiles 169 retrieved from the management console 116. Each OEM can have a unique protocol for delivering the platform-specific device profiles to client devices 112. One non-limiting example of an OEM specific messaging service 106 can be Apple's Apple Push Notification service (APNs).

The OEM specific messaging service 106 can receive generated device profiles from the management console 116. In some examples, the OEM specific messaging service 106 can be configured to transmit an indication to the client device 112 that a platform-specific device profile is ready to be retrieved. The OEM specific messaging service 106 can transmit this indication in response to receiving a notification from the management console 116. In other cases, the client device 112 can be configured to check with the OEM specific messaging service 106. In other examples, the client device 112 can check on an interval basis with the OEM specific messaging service 106 whether there is new device profile. If so, the client device 112 can proceed to receive the device profile from the OEM specific messaging service 106.

The definition file repository 109 can operate to provide metadata files to the management console 116. The definition file repository 109 can provide the metadata files on a synchronized schedule or upon demand. The definition file repository 109 can include a data store 172 that comprises definition file data 175. The definition file data 175 can include definition files that provide a definition of the required platform-specific parameters for rendering user interface elements for a profile user interface. An enterprise management developer can update and create new definition files to accommodate new features of software platforms. The enterprise management developer can store the definition files at the definition file repository 109. The definition file repository 109 can also execute a translation application 174. The translation application 174 can translate an OEM definition file from an OEM Definition File Service to a console definition file that is used by the management console 116.

The client device 112 can be representative of one or more client devices 112. The client device 112 can include a processor-based system, such as a computer system, that can include a desktop computer, a speaker system, a laptop computer, a personal digital assistant, a cellular telephone, a smartphone, a set-top box, a music player, a tablet computer system, a game console, an electronic book reader, or any other device with like capability. The client device 112 can also be equipped with networking capability or networking interfaces, including a localized networking or communication capability, such as a near-field communication (NFC) capability, radio-frequency identification (RFID) read or write capability, or other localized communication capability.

The client device 112 can include an operating system 145 configured to execute various client applications 142, such as the enterprise agent 148, and any other client applications 142. Some client applications 142 can access network content served up by the management system 103 or other servers, thereby rendering a user interface on a display, such as a liquid crystal display (LCD), touch-screen display, or other type of display device. To this end, some client applications 142 can include a web browser or a dedicated application, and a user interface can include a network page, an application screen, or other interface. Further, other client applications 142 can include device management applications, enterprise applications, social networking applications, word processors, spreadsheet applications, media viewing applications, or other applications.

In some examples, at least a portion of the client applications 142 are "managed applications" where the enterprise agent 148 oversees or controls operation of the client applications 142. For instance, using a management console 116, an administrator of the management console 116 can distribute, secure, and track client applications 142 installed on client devices 112 enrolled with the management console 116. In some examples, the enterprise agent 148 can configure and verify that managed applications operate in conformance with the compliance rules 130.

The client device 112 can also include a data store 156. The data store 156 can include memory of the client device 112 or any other storage resources on which data can be stored by the client device 112. The data store 156 can include enterprise device profiles 155 and enterprise data 158. The enterprise device profile 155 can include platform-specific device profiles that are configured to enforce software and/or hardware restrictions on the client device 112. The platform-specific device profiles can comprise platform-specific code executed on the targeted platform. The enterprise data 158 can include confidential data that is within the monitoring scope of the enterprise policies. The data store 156 can include other data associated with the client application 142, the operating system 145, and the enterprise agent 148. The data stored in the data store 156, for example, can be associated with the operation of the various applications or functional entities described below.

Figure 1B:
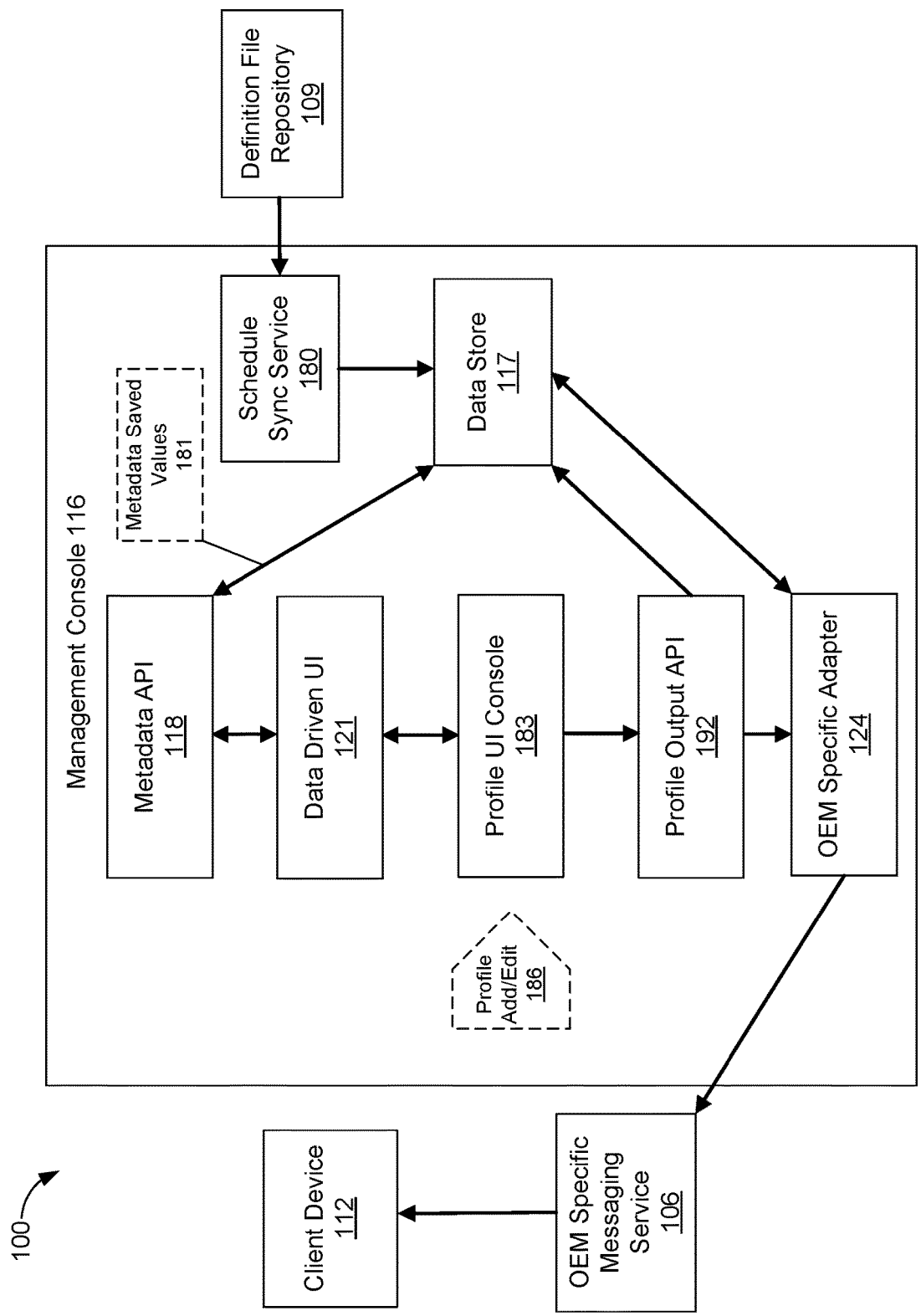
FIG. 1B is an exemplary drawing of the components implemented by the management console.

FIG. 1B illustrates an example of a work flow of various components executed by the management console 116. Referring between FIGS. 1A and 1B, a general description of the operation of the various components of the networked environment 100 is provided. Assuming that a new feature has been added to a particular operating system, an enterprise management developer can update or create a definition file that accommodates the feature. As an example, a mobile operating system may add a new camera feature, a new Wi-Fi setting, and other suitable features. In one example, among others, the definition file can be a text file that defines the minimum parameters needed to be obtained at the profile creation stage by the administrator. These parameters are used to render one or more profile user interface instances for an operating system or application. The parameters can include unique platform-specific identifiers and a parameter type for a targeted platform. Some non-limiting examples of a parameter type may include a checkbox, a textbox, drop-down menu, a numerical value, and other suitable parameter types associated with software platforms.

After the definition file has been configured to accommodate the new feature, the enterprise management developer can load the definition file in the definition file repository 109. The definition file repository 109 can transmit the definition file to the management console 116. A schedule sync service 180 can synchronize the latest definition file stored in the definition file repository 109 with the version stored in the data store 117. In some examples, the management console 116 can periodically check with the definition file repository 109 to determine if there is a new definition file to retrieve. In other examples, the management console 116 can transmit a notification to the management console 116 that a new definition file needs to be obtained from the definition file repository 109. When there is a new definition file to retrieve, the management console 116 can retrieve the new definition file and store it in the data store 117. The metadata API 118 can retrieve the definition file in order to determine the parameters needed to render a particular user interface instance associated with a particular operating system platform. For example, the management console 116 can receive a request to generate a device profile for a platform from a user interface. The management console 116 can then retrieve the definition file associated with the platform from the data store 117.

The Data Driven UI 121 can reference the definition file to determine what minimum parameters need to be rendered on a particular profile user interface for the targeted platform. The definition file can comprise platform-specific parameters associated with the platform. These platform-specific parameters can represent the settings that need to be configured to generate the device profile. The Data Driven UI 121 can use the unique user interface identifiers associated with each platform-specific parameter for rendering on a browser, which involves painting, using HTML 5 for example, user interface elements that correspond with the platform-specific parameters on the profile user interface. The unique user interface identifiers can be used as a reference for an element within the profile user interface and the unique user interface identifiers can be used for formatting of the element (e.g., ordering and placement of elements on a web page layout, font color, size, etc.). In other words, Data Driven UI 121 renders a data driven user interface for configuring the device profile based at least in part on the definition file. Rendering the data driven user interface can comprises displaying user interface elements that each correspond with one of the platform-specific parameters.

In some cases, the Data Driven UI 121 can retrieve a previous instance of a profile user interface from the profile UI data 127. The previous instance of the profile user interface and its previous settings can be stored in the data store 117 as metadata. Additionally, the previous settings can be saved as values, as indicated by reference number 181. The Profile UI Console 183 can enable an administrator to add a new profile or edit an existing profile, as shown by reference number 186. When adding a new profile, the Profile UI Console 183 can extract existing values from the previous profile and apply the extracted values to the corresponding parameters in the new profile. In some cases, the new definition file for the new profile can require new parameters. After the extracted values from the previous profile have been applied, the new parameters can be assigned a null value.

The Profile UI Console 183 can receive user-inputs for at least one of the user interface elements and retrieve values from the user interface elements. The retrieved values can be used to configure the platform features for the platform. As an example, an existing definition file can comprise first name and last name parameters. The first name parameter can comprise a first parameter type, such as a textbox, and a first platform-specific user interface identifier. The last name parameter can comprise a second parameter type, such as a textbox, and a second platform-specific user interface identifier. In this example, the definition file has a new parameter for address. The address parameter can comprise a textbox for a parameter type and a third platform-specific user interface identifier. Since the previous profile user interface has values for the first name and last name, those values can be applied to the new profile user interface. In this example, the previous values were "John" for the first name and "Doe" for the last name. The new profile user interface would apply these values and assign a null value to the address parameter because it is a new parameter. When rendered, the administrator can insert a value for the address parameter in order to proceed with generating a device profile for the software platform. After the profile has been configured, the administrator can trigger the management console 116 to generate the platform-specific device profile.

The Profile Output API 192 can provide an output of the data driven user interface after the administrator manipulates the management console 116 to initiate the creation of a device profile. The Profile Output API 192 can also process the values associated with the data driven user interface in preparation for the OEM specific adapter 124. Continuing with the previous example, the Profile Output API 192 can retrieve the values of "John," "Doe," and a new entry for the address parameter. The Profile Output API 192 would also retrieve the corresponding platform-specific user interface identifiers.

The OEM specific adapter 124 can use the definition file to translate the retrieved values and platform-specific user interface identifiers into an executable platform device profile that can be executed on a particular client device 112. Some examples of an executable device profile file formats may include a JavaScript Object Notation (JSON), an Extensible Markup Language (XML), and other suitable device file formats. The device profile can include one or more restrictions that correspond with the enterprise policies of the enterprise.

In some examples, the device profile can be transmitted from the management console 116 to the OEM specific messaging service 106 and later transmitted to the client device 112 from the OEM specific messaging service 106. In other examples, after the device profile has been generated, it can be stored in a command queue for a particular client device 112. The device profile can be transmitted from the command queue upon receiving a request from the client device 112. Once stored within the client device 112, the device profile can enforce the restrictions on the client device 112.

Figure 2:
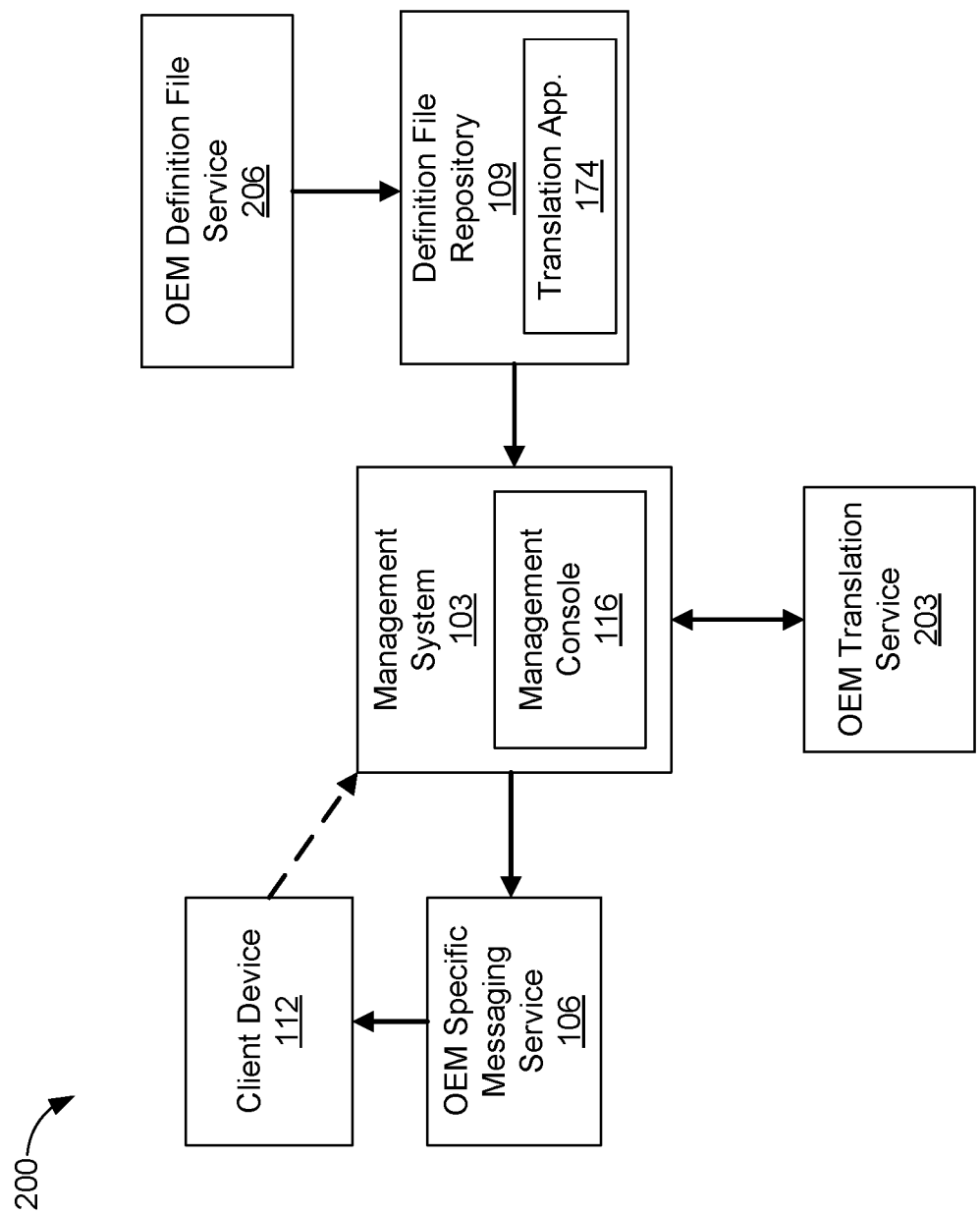
FIG. 2 is a drawing of an alternative example of a networked environment that includes a management console in communication with the OEM specific messaging service, an OEM translation service, the definition file repository, and an OEM definition file service over a network.

With reference to FIG. 2, shown is an alternative networked environment 200 that includes a management console 116 in communication with the OEM specific messaging service 106, the definition file repository 109, an OEM translation service 203, and an OEM definition file service 206 over the network 115. In the illustrated example, the OEM definition file service 206 can provide an OEM definition file for a new version of the OEM's platform. For example, a new version of an operating system platform may support new features such as new camera control settings or new methods of customizing power management for the client device 112. New platform-specific parameters can be included in a new OEM definition file, which can be transmitted to the definition file repository 109. The definition file repository 109 can use the translation application 174 to translate the OEM definition file to a console definition file, which is a definition file that used by the management console to render a data driven user interface. The translation process can involve mapping platform-specific parameters in the OEM definition file to the platform-specific identifier and it corresponding parameter type associated with the console definition file.

In addition, the translation application 174 can identify new parameters in the OEM definition file. This process may involve a comparison with the previous OEM definition and the latest definition file. After identifying new parameters, the translation application 174 can assign a new platform-specific identifier and a null value to the platform-specific identifier. In addition, the translation application 174 can identify a field type for the new parameters. In some examples, the definition file repository 109 can be omitted and the OEM definition file can be transmitted to the management console 116. In this case, the translation application 174 would be executed by the management system 103.

In other examples, the management console 116 can use an OEM translation service 203 to generate a device profile from the retrieved values of the data driven user interface. In this example, the management console 116 may not execute a translation step, as discussed previously. Instead, in one example, the management console 116 can transmit the retrieved values from the data driven user interface to the OEM translation service 203 for generating the device profile. In some examples, this process may involve mapping the retrieve values to an OEM definition file format.

In some examples, the device profile can be transmitted from the OEM translation service 203 to an OEM specific messaging service 106 for facilitating an installation of the device profile at the client device 112. In other examples, the generated device profile can be transmitted to the management console 116, which can then facilitate the installation of the device profile at the client device 112.

Next, a general description of the operation of the various components of the networked environment 200 is provided. To begin, the management console 116 can receive, over the network 115, the definition file for a target platform from the definition file repository 109. The definition file can comprise various platform-specific parameters associated with the target platform. In some examples, the definition file repository can periodically transmit to the management console 116 the latest version of the definition file, and in some cases the previous definition file may be deleted.

In addition, in some examples, the definition file repository 109 can receive an OEM definition file from an OEM definition file service 206. In this scenario, an entity associated with the management console 116 does not have to manually configure a new definition file after the release of a new version of an OEM's platform. Instead, the OEM can provide the OEM definition file to the definition file repository 109. The OEM definition file can be translated to a console definition file that is used for rendering the data driven user interface. In this scenario, the release of new features by an OEM can be automatically supported when the OEM provides the OEM definition file.

The management console 116 can then receive a request to generate a device profile for the target platform from a user interface manipulated by a user. A data driven user interface can be rendered for configuring the device profile based at least in part on the console definition file. For example, rendering the data driven user interface can involve displaying user interface elements that correspond with the platform-specific parameters. Then, the management console 116 can receive user-input for the user interface elements. In some cases, when a user-input is received, the input can modify a respective value associated with a platform-specific parameter. After the user has completed entering their security settings, the user can manipulate a user interface button to initiate generating the device profile.

The management console 116 can retrieve the values from the user interface elements rendered on the data driven user interface. For example, whether or not a check box is checked on the profile user interface for a specific feature of the platform can correspond with a particular value. The management console 116 can then generate the device profile based on a translation of the values into an executable device profile. In some examples, the translation of the values can be performed by the OEM translation service 203.

In addition, the networked environment 200 can support various methods for delivering the device profile to the client device 112. In one example, after the device profile has been generated, the management console 116 can transmit a command to the OEM specific messaging service 106 to facilitate an installation of the device profile in the client device 112. The command to the OEM specific messaging service 106 can comprise instructing the OEM specific messaging service 106 to transmit a notification message to the client device 112. The notification message can instruct the client device 112 to retrieve the device profile from the management console 116. For instance, the notification message can comprise a uniform resource locator (URL) link for the client device 112 to activate in order to retrieve the device profile from a command queue.

In another delivery method, transmitting the command to the OEM specific messaging service 106 to the client device 112 can include transmitting the command and the device profile to the OEM specific messaging service 106. Additionally, the command can include instructing the OEM specific messaging service 106 to transmit the device profile to the client device 112 and command the client device 112 to install the device profile.

Figure 3:
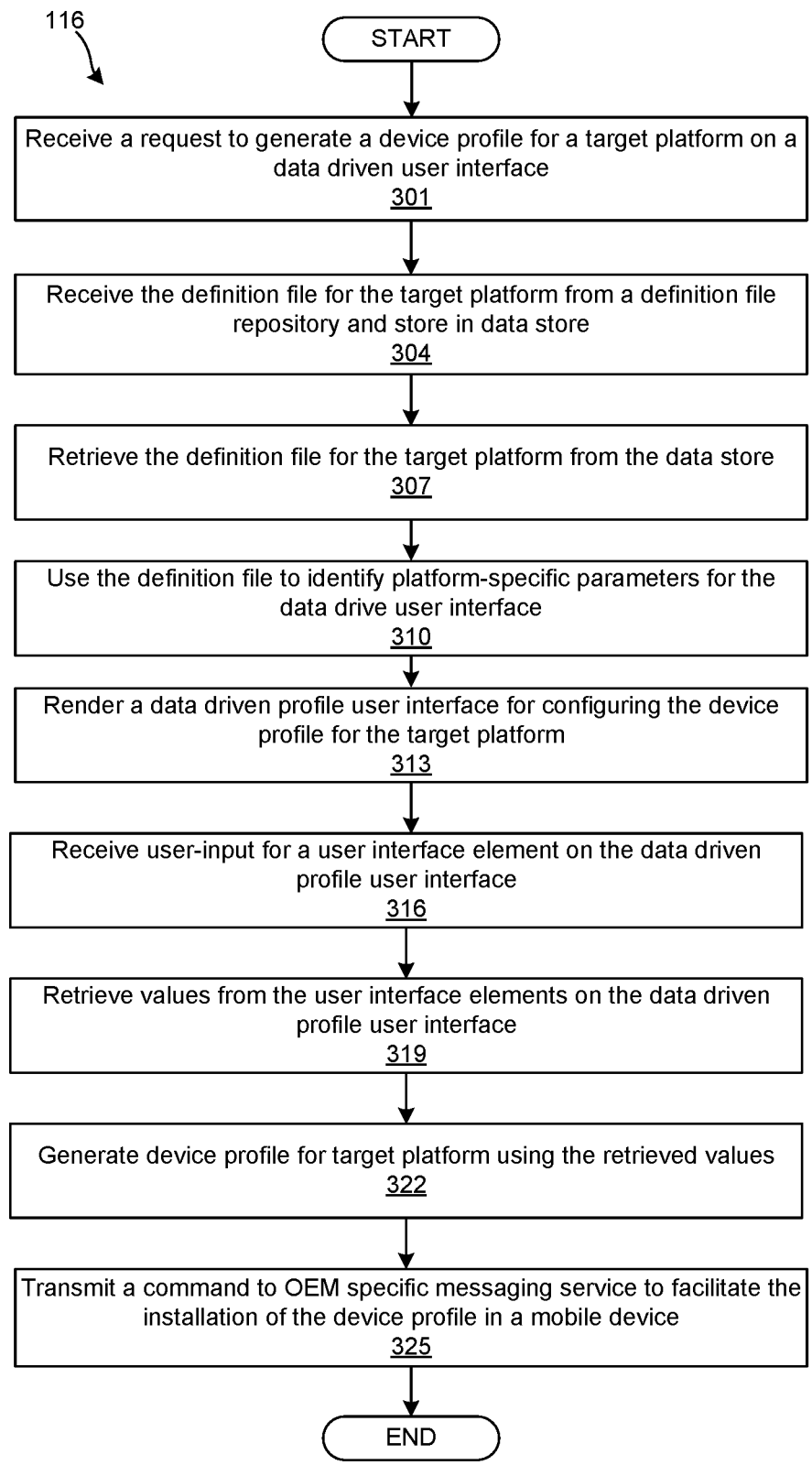
FIG. 3 is an example flowchart illustrating functionalities implemented by the management console executed in the management system.

With reference to FIG. 3, shown is a flowchart that provides one example of the operation of a portion of the management console 116 according to various examples. It is understood that the flowchart of FIG. 3 provides merely an example of the many different types of functional arrangements that can be employed to implement the operation of the portion of the management console 116 as described herein.

Beginning with step 301, the management console 116 can receive a request to generate a device profile for a target platform on a data driven user interface. The request can be generated by an administrator manipulating a user interface, such as clicking on a respective user interface component. Next, in step 304, the management console 116 can receive the definition file for the target platform from a definition file repository 109 and store the definition file in a data store 117 associated with the management console 116. In some exemplary implementations, the definition file repository 109 can transmit the latest definition file for the targeted platform on-demand, on a periodic interval, or at other suitable intervals. The definition file repository 109 can receive a new definition to support a new setting or feature of a particular software platform, such as an operating system or a software application. In some examples, each feature of an operating system in the definition file can be assigned a unique user interface identifier. The definition file can be a text file that comprises one or more platform-specific parameters that are used to render a profile user interface. In some examples, the platform-specific parameters can be the minimum parameters needed to enable/disable the various features or settings for a device profile. Thus, these platform-specific parameters can be displayed in a user interface for an administrator to configure. For example, a "yes" box and/or "no" box can be displayed in a user interface to provide a means for the administrator to either enable or disable a new camera setting of an operating system.

In step 307, the management console 116 can retrieve the definition file for the target platform from the data store 117. In some examples, the management console 116 can transmit a message to the definition file repository 109 on an interval basis in order to determine whether there is a new definition file.

In step 310, the management console 116 can use the definition file to identify platform-specific parameters for the data driven user interface. The definition file can provide a template of the platform-specific parameters that are required to enable a particular feature in targeted operating system. Each platform-specific parameter can be associated with a unique user interface identifier from the definition file.

In step 313, the management console 116 can render a data driven profile user interface for configuring the device profile for the target platform. The data drive profile user interface can include user interface elements that correspond with each platform-specific parameters. In some cases, a previous profile user interface may exist with previous values for the platform-specific parameters. In the previous profile user interface, the values for the platform-specific parameters can be extracted and applied to the user interface elements displayed in the new profile user interface.

In step 316, the management console 116 can receive user-input for the user interface elements on the data driven profile user interface. For example, the user can enter a setting such as checking a user interface box that indicates a particular Wi-Fi setting should be enabled. Each manipulation of a user interface element can be converted to a value. In some scenarios, a default setting can be set or a previous setting can be retrieved from the previous rendering of the data driven profile user interface.

In step 319, the management console 116 can retrieve values from the user interface elements on the data driven profile user interface. In other words, the management console 116 can retrieve a value for each of the user interface elements rendered on the profile user interface, where each user interface element corresponds to a platform-specific parameter.

In step 322, the management console 116 can generate a device profile for the target platform using the retrieved values and the definition file. In some exemplary implementations, the management console 116 can translate the retrieve values into a device profile using the definition file. Particularly, the translation process can involve referencing the definition file and the relevant unique user interface identifiers to map the values of the unique user interface identifiers to an appropriate software code that can configure the device profile according to the configuration selected by the user on the profile user interface. After the device profile has been generated, the management console 116 can store the device profile in a command queue associated with the managed client device 112. For instance, the device profile can be stored in a command queue stored in the data store 117.

In step 325, the management console 116 can transmit a command to the OEM specific messaging service to facilitate the installation of the device profile in the client device 112, such as a mobile device. In some exemplary implementations, the OEM specific messaging service 106 can transmit an indication to the client device 112 that a new device profile is ready for retrieval. The client device 112 can then receive the device profile from the management system 103 or the OEM specific messaging service 106. For instance, the OEM specific messaging service 106 can transmit a command to the client device 112 to retrieve the device profile from the command queue associated with the client device 112. The command queue can be stored in the data store 117 associated with the management system 103. Thus, from the command queue, the management system 103 can distribute the device profile and other suitable content to the client device upon receiving a request or an indication of an activation of an uniform resource location (URL) link from the client device 112. In other exemplary implementations, the management console 116 can transmit the device profile to the OEM specific messaging service, which can relay the device profile to the client device 112. Then, the management console 116 proceeds to the end of the process.

Figure 4A:
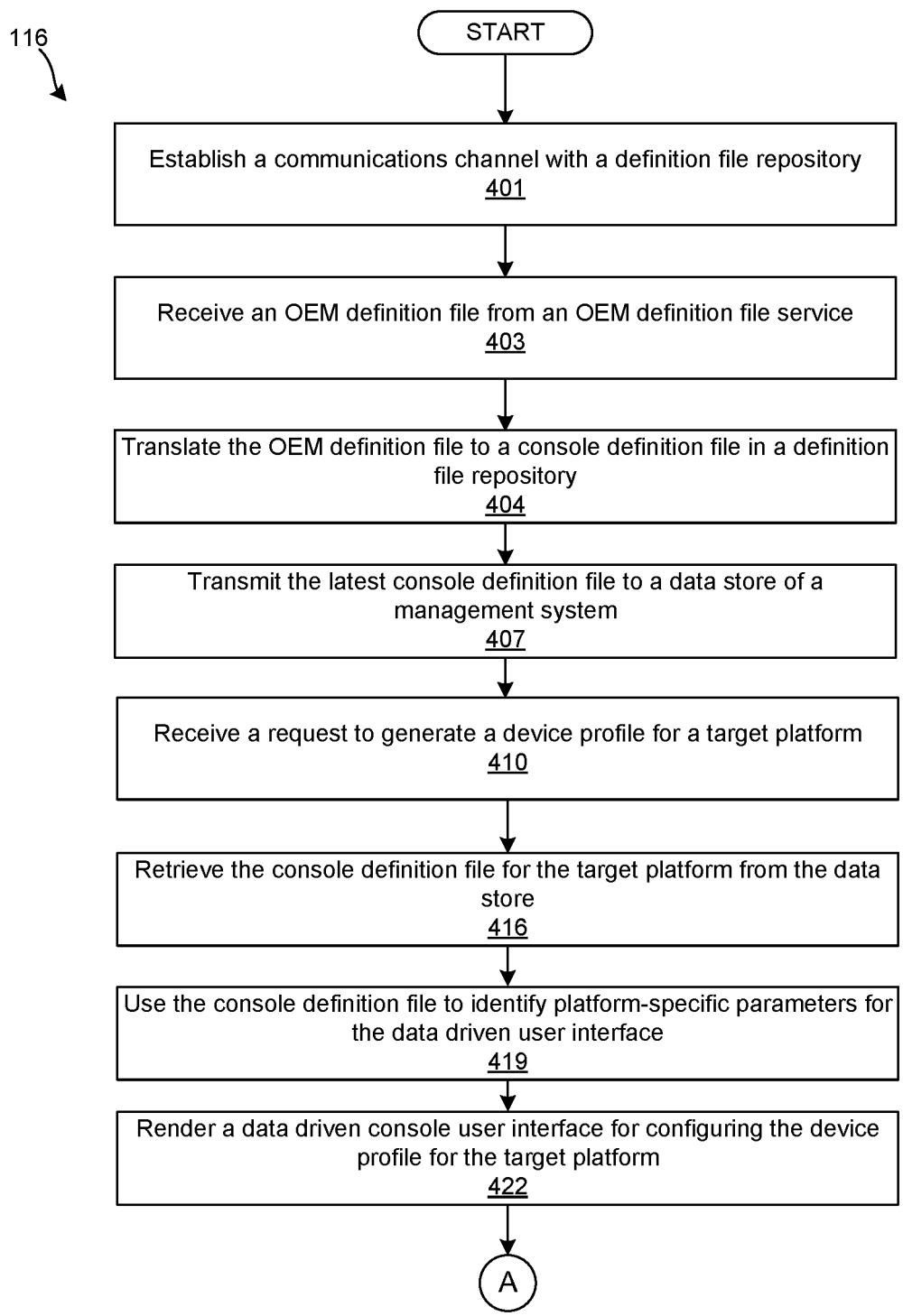
FIGS. 4A and 4B are example flowcharts illustrating functionalities implemented by the management console and the definition file repository.
Figure 4B:
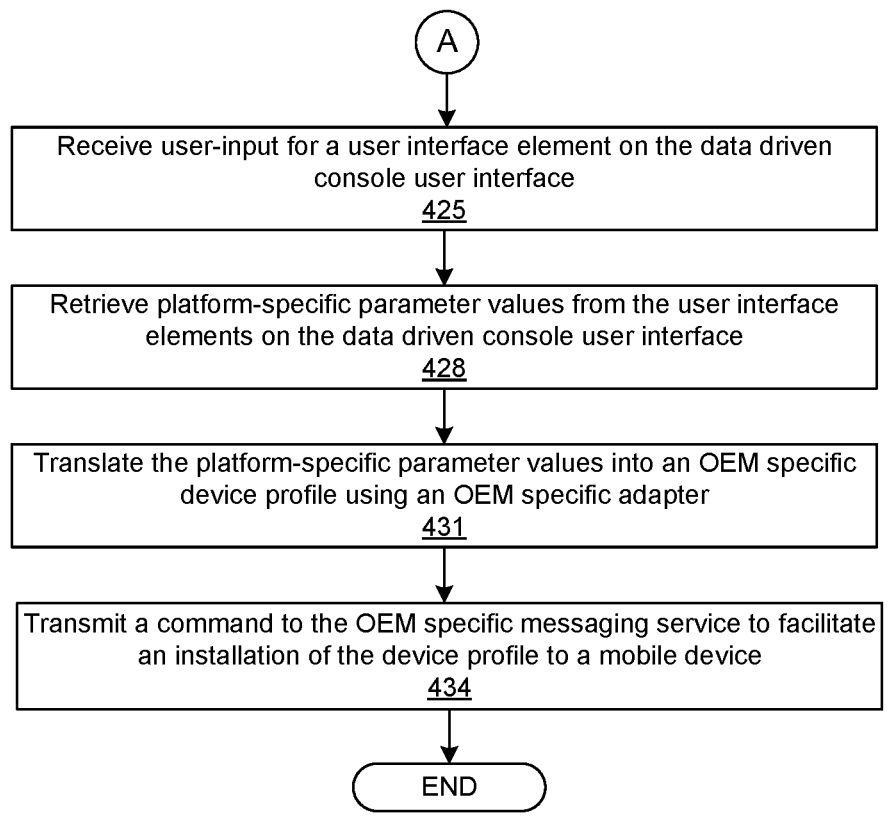

Referring next to FIGS. 4A and 4B, shown is a flowchart that provides one example of the operation of a portion of the management console 116 according to various examples. It is understood that the flowchart of FIGS. 4A and 4B provides merely an example of the many different types of functional arrangements that can be employed to implement the operation of the portion of the management console 116 as described herein.

Beginning with step 401, the management console 116 can establish a communications channel with a definition file repository 109. In some examples, the establishment of the communications channel can involve the management console 116 transmitting a request to the definition file repository 109 to receive a definition file. In another example, the management console 116 can transmit a command to the definition file repository 109 using an application programming instance (API) of the definition file repository 109. In this example, the command can cause the definition file repository 109 to transmit the definition file to the management console 116. In another exemplary implementation, the establishment of the communications channel can involve the management console 116 participating in an authentication process by transmitting credentials to the definition file repository 109. In another example, the management console 116 can subscribe to a subscription service associated with the definition file repository 109. The subscription service can instruct the definition file repository 109 to transmit a latest definition file to the management console 116 on a periodic basis, whenever a particular definition file has been update, or at other suitable intervals.

In step 403, the management console 116 can facilitate receiving an OEM definition file from an OEM definition file service 206. In some exemplary implementations, the OEM definition file can be received by the data store 117 and in other implementations, the OEM definition file can be received by the definition file repository 109.

In step 404, the management console 116 can translate the OEM definition file to a console definition file in the definition file repository 109. For example, the OEM definition file can comprise parameter names and field types that may be converted to platform-specific parameter names, unique user interface identifiers, and data types used by the management console 116. In some cases, the translation process can involve mapping the OEM platform-specific parameter to the console platform-specific parameters.

In step 407, the management console 116 can transmit the latest console definition file to the data store 117 of the management system 103. As previously discussed, the latest console definition file may be transmitted on a periodic interval, on-demand, or at any other suitable frequency. Next, in step 410, the management console 116 can receive a request to generate a device profile for a target platform. For example, a user may desire to configure a new device profile or edit an existing device profile in response to a new feature has been added to a target platform. In step 416, the management console 116 can retrieve the console definition file for the target platform from the data store 117. Next, in step 419, the management console 116 can use the definition file to identify platform-specific parameters for the data driven user interface.

In step 422, the management console 116 can render a data driven user interface for configuring the device profile for the target platform. The data driven console user interface can display the platform—specific parameters that are needed to configure a device profile. In some exemplary implementations, a platform-specific parameter that was recently added to the console definition file may have a null value because it does not have a value set by the user. In other implementations, the previously used settings for configuring a device profile for the platform may be rendered.

In step 425, the management console 116 can receive user-input for a user interface element on the data driven console user interface. For instance, user-input can comprise a user checking a box, selecting a menu item from a menu, entering text into a text box, or any other suitable method for data entry by way of a user interface.

In step 428, the management console 116 can retrieve platform-specific parameter values from the user interface elements on the data driven user interface, such as a profile user interface. In some scenarios, a user may enter a value that modifies a previously stored value for a respective parameter. Next, in step 431, the management console 116 can translate the platform-specific parameter values into an OEM specific device profile using an OEM specific adapter 124. In some exemplary implementations, each platform-specific parameter can have a unique parameter identifier. The unique parameter identifier can be used to configure a device profile according to the value retrieved from the data driven user interface. After the values have been translated and the device profile has been generated, the management console 116 can store the device profile in a command queue associated with the managed client device 112. For instance, the device profile can be stored in a command queue stored in the data store 117.

Next, in step 434, the management console 116 can transmit a command to the OEM specific messaging service 106 to facilitate an installation of the device profile to the client device 112. As previously discussed, there are various methods in which the device profile can be installed in the client device 112. For example, the management system 103 can transmit the device profile from a command queue associated with the client device 112 upon receiving a request from the client device 112 or the OEM specific messaging service 106. In other examples, the OEM specific-messaging service 106 can transmit the device profile to the client device 112. Then, the management console 116 proceeds to the end of the process.

Figure 5A:
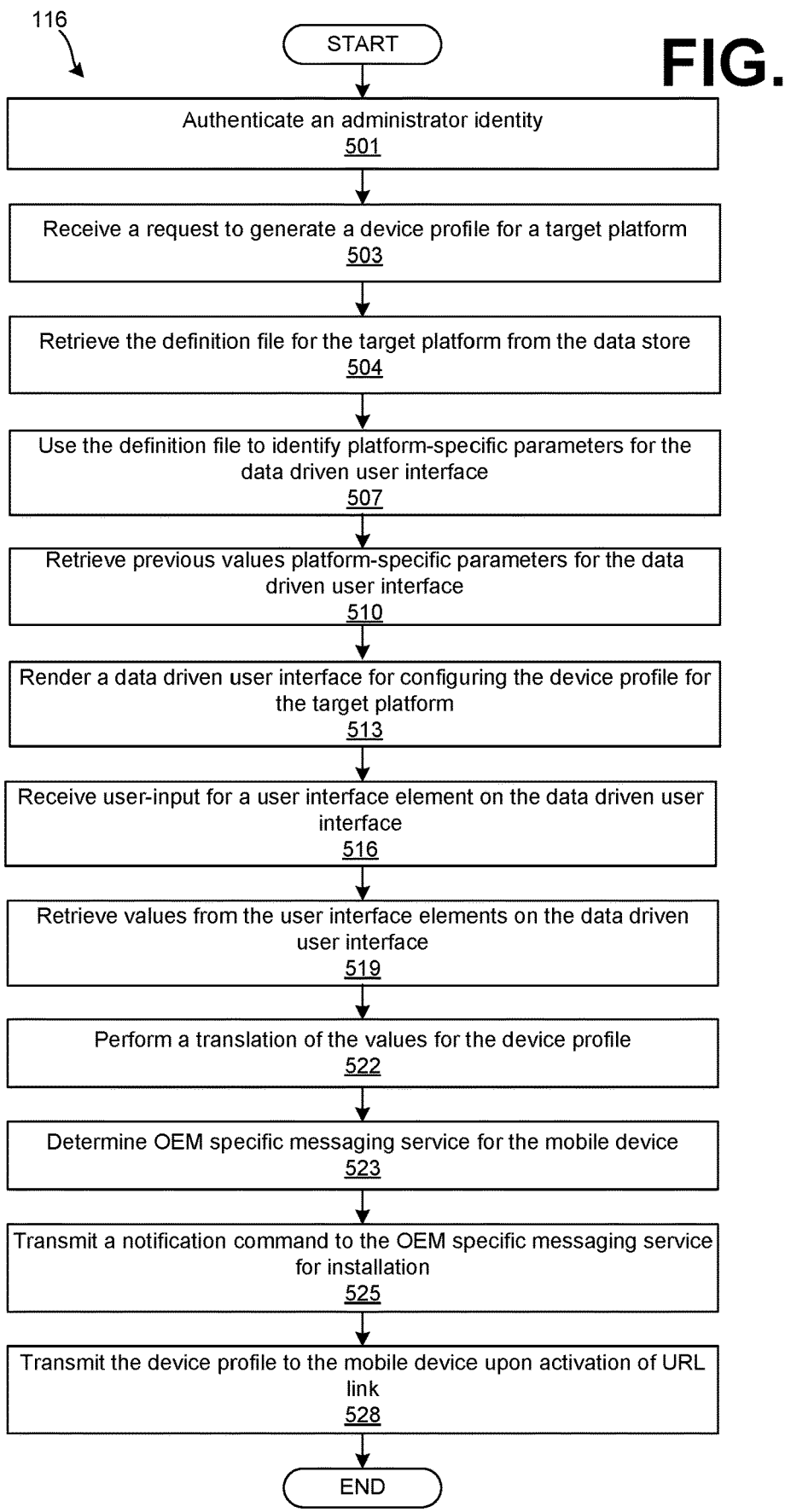
FIG. 5A is an example flowchart illustrating functionalities implemented by the management console and the OEM specific messaging service for generating and installing a device profile in the client device.

With reference to FIG. 5A, shown is a flowchart that provides one example of the operation of a portion of the management console 116 and the OEM specific messaging service 106 for generating and installing a device profile in the client device 112 according to various examples. It is understood that the flowchart of FIG. 5A provides merely an example of the many different types of functional arrangements that can be employed to implement the operation of the portion of the management console 116 as described herein.

Beginning with step 501, the management console 116 can authenticate an administrator identity. The authentication process can involve validating credentials received from a user interface rendered for an administrator. In step 503, the management console 116 can receive a request to generate a device profile for a target platform on a data driven user interface, such as a profile user interface. Next, in step 504, the management console 116 can retrieve the definition file for the target platform from the data store 117. In step 507, the management console 116 can use the definition file to identify platform-specific parameters associated with the target platform, in which user interface elements can be rendered on the data driven user interface to correspond with the platform-specific parameters. Then, in step 510, the management console 116 can retrieve previous values for the platform-specific parameters for the data driven user interface. In some examples, a respective platform-specific parameter may be rendered for a first time because it was recently added to the definition file. In this scenario, the respective platform-specific parameter may have a null value assigned.

In step 513, the management console 116 can render the data driven user interface for configuring the device profile for the target platform. The management console 116 can render user interface elements that correspond with the platform-specific parameters and the previously stored values for the platform-specific parameters.

Next, in step 516, the management console 116 can receive user-inputs for one or more respective user interface elements on the data driven user interface. For example, the user-input can be received by the user checking a box, selecting a menu item, entering text into a text box, and any other suitable method for data entry. Next, in step 519, the management console 116 can retrieve values from the user interface elements on the data driven user interface. In some exemplary implementations, the values can be retrieved from the user interface elements rendered on the data driven user interface. The retrieval of the values can capture the settings the user desires for the device profile.

In step 522, the management console 116 can perform a translation of the values for the platform device profile. In some exemplary implementations, the translation can be based on a unique parameter identifier that corresponds with a specific platform feature or setting associated with the platform feature. The values can be used to configure the device profile according to the settings entered by the user. In some examples, the translation of the values can be performed by the OEM translation service 203. After the values have been translated and the device profile has been generated, the management console 116 can store the device profile in a command queue associated with the managed client device 112. For instance, the device profile can be stored in a command queue stored in the data store 117.

In step 523, the management console 116 can determine an OEM specific messaging service 106 for communicating the device profile to the client device 112. The OEM specific messaging service 106 can be determined from multiple OEM specific messaging services 106, where each OEM specific messaging service 106 can be unique for a particular target platform. For example, OEM's such as Google, Apple, Microsoft, Android, and others may each have one or more messaging services associated with their operating systems. In some examples, the determination of the OEM specific messaging service 106 can involve identifying a management record associated with a targeted client device 112 or by identifying the target platform from the request to generate the device profile. After the OEM specific messaging service 106 has been identified, the management console 116 can map the target platform to an applicable OEM messaging service 106 and identify particular servers used by the OEM specific messaging service 106. The identification of the particular servers can include retrieving internet protocol (IP) addresses, credentials, authentication tokens, certificates, keys, and other suitable data used for connecting with the OEM specific messaging service 106. Then, the management console 116 can establish a communications channel with the OEM specific messaging service 106. In some examples, the establishment of the communications channel can involve executing an authentication process, where the authentication data is provided to the OEM specific messaging service 106.

In step 525, the management console 116 can transmit a notification command to OEM specific messaging service 106 to facilitate installation of the device profile in the client device 112. In some exemplary implementation, the notification command instructs the OEM specific messaging service 106 to transmit a message to the mobile device that instructs the mobile device to contact the management system 103. For example, the message can comprise instructions for the mobile device to activate a uniform resource locator (URL) link in order to retrieve the device profile. The URL link can be an Internet protocol (IP) address of an end point device configured to distribute the content of a particular command queue to the managed client device 112 upon receiving a request. In some examples, the request can be generated from an activation of the URL link by the client device 112. Then, in step 528, the management console 116 can transmit the content of a particular command queue associated with the client device 112 to the mobile device upon activation of the URL link. The content of the particular command queue can include the device profile and other suitable content for the client device 112. Then, the management console 116 proceeds to the end.

Figure 5B:
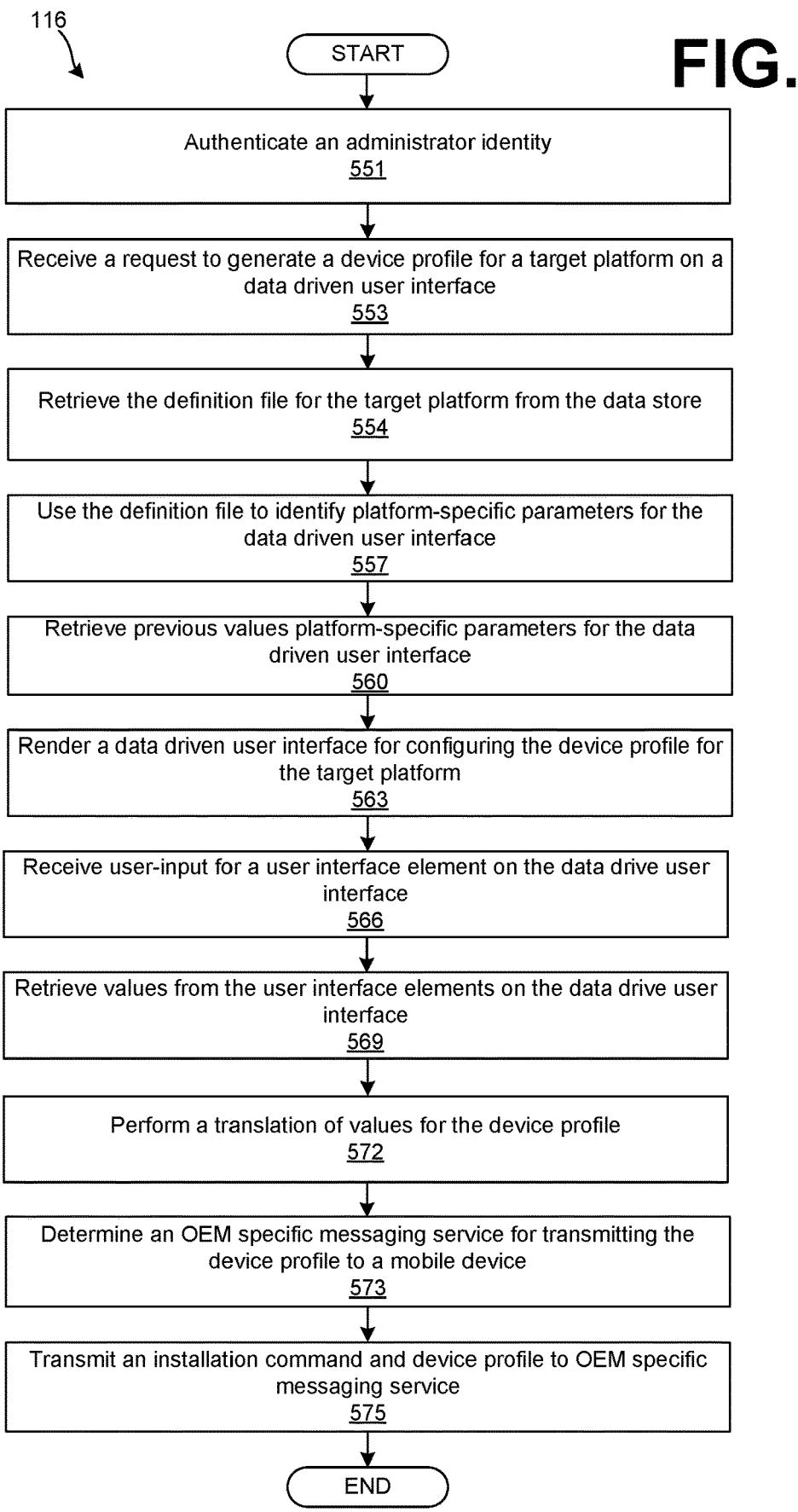
FIG. 5B is another example flowchart illustrating functionalities implemented by the management console and the OEM specific messaging service for generating and installing a device profile in the client device.

With reference to FIG. 5B, shown is a flowchart that provides another example of the operation of a portion of the management console 116 and the OEM specific messaging service 106 for generating and installing a device profile in the client device 112 according to various examples. It is understood that the flowchart of FIG. 5B provides merely an example of the many different types of functional arrangements that can be employed to implement the operation of the portion of the management console 116 as described herein.

Beginning with step 551, the management console 116 can authenticate an administrator identity of a user. The authentication process can involve validating credentials received from a user interface. In step 553, the management console 116 can receive a request to generate a device profile for a target platform on a data driven user interface. Next, in step 554, the management console 116 can retrieve the definition file for the target platform from the data store 117. Next, in step 557, the management console 116 can use the definition file to identify platform-specific parameters for the data driven user interface. Then, in step 560, the management console 116 can retrieve previous values for the platform-specific parameters for the data driven user interface. In some examples, a respective platform-specific parameter may be rendered for a first time because it was recently added to the definition file. In this scenario, the respective platform-specific parameter may have a null value assigned.

In step 563, the management console 116 can render the data driven user interface for configuring the device profile for the target platform. The management console 116 can render user interface elements that correspond with the platform-specific parameters and the previously stored values for the platform-specific parameters.

In step 566, the management console 116 can receive user-input for a respective user interface element on the data driven user interface. Next, in step 569, the management console 116 can retrieve values from the user interface elements on the data driven user interface. In some exemplary implementations, the values can be retrieved from the user interface elements rendered on the data driven user interface. The retrieval of the values can capture the settings the user desires for the device profile.

In step 572, the management console 116 can perform a translation of values for the platform device profile. In some exemplary implementations, the translation can be based on a unique parameter identifier that corresponds with a specific platform feature or setting associated with the platform feature. The values can be used to configure the device profile according to the settings entered by the user. In some examples, the translation of the values can be performed by the OEM translation service 203.

In step 573, the management console 116 can determine an OEM specific messaging service 106 for communicating the device profile to the client device 112. The OEM specific messaging service 106 can be determined from multiple OEM specific messaging services 106, where each OEM specific messaging service 106 can be unique for a particular target platform. For example, OEM's such as Google, Apple, Microsoft, Android, and others may each have one or more messaging services associated with their operating systems. In some examples, the determination of the OEM specific messaging service 106 can involve identifying a management record associated with a targeted client device 112 or by identifying the target platform from the request to generate the device profile. After the OEM specific messaging service 106 has been identified, the management console 116 can map the target platform to an applicable OEM messaging service 106 and identify particular servers used by the OEM specific messaging service 106. The identification of the particular servers can include retrieving data such as internet protocol (IP) addresses, credentials, authentication tokens, certificates, keys, and other suitable data used for connecting with the OEM specific messaging service 106. Then, the management console 116 can establish a communications channel with the OEM specific messaging service 106. In some examples, the establishment of the communications channel can involve executing an authentication process, where the authentication data is provided to the OEM specific messaging service 106.

In step 575, the management console 116 can transmit an installation command and the device profile to the OEM specific messaging service 106. In some exemplary implementation, the definition file can be transmitted to the OEM specific messaging service 106 as well. The OEM specific messaging service 106 can push the device profile and an installation command to the mobile device.

The management system 103, the OEM specific messaging service 106, the definition file repository 109, the client devices 112 and other suitable devices can include at least one processor circuit, for example, having a processor and at least one memory device, both of which couple to a local interface, respectively. The client device 112 can include, for example, at least one computer, a mobile device, smartphone, a table computer, a speaker system, a personal assistant device, a computing device, or like device. The local interface can include, for example, a data bus with an accompanying address/control bus or other bus structure.

A number of software components are stored in the memory and executable by a processor. In this respect, the term "executable" means a program file that is in a form that can ultimately be run by the processor. Examples of executable programs can be, for example, a compiled program that can be translated into machine code in a format that can be loaded into a random access portion of one or more of the memory devices and run by the processor, code that can be expressed in a format such as object code that is capable of being loaded into a random access portion of the one or more memory devices and executed by the processor, or code that can be interpreted by another executable program to generate instructions in a random access portion of the memory devices to be executed by the processor. An executable program can be stored in any portion or component of the memory devices including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

Memory can include both volatile and nonvolatile memory and data storage components. Also, a processor can represent multiple processors and/or multiple processor cores, and the one or more memory devices can represent multiple memories that operate in parallel processing circuits, respectively. Memory devices can also represent a combination of various types of storage devices, such as RAM, mass storage devices, flash memory, or hard disk storage. In this case, a local interface can be an appropriate network that facilitates communication between any two of the multiple processors or between any processor and any of the memory devices. The local interface can include additional systems designed to coordinate this communication, including, for example, performing load balancing. The processor can be of electrical or of some other available construction.

The client devices 112 can include a display upon which user interface(s) generated by the client application(s) 142, the enterprise agent 148, or another application can be rendered. The client device 112 can also include one or more input/output devices that can include, for example, a capacitive touchscreen or other type of touch input device, fingerprint reader, or keyboard.

Although the management console 116, the client applications 142, the enterprise agent 148, the translation application 174, the operating system 145, and other various services and functions described can be embodied in software or code executed by general purpose hardware as discussed above. As an alternative, the same can also be embodied in dedicated hardware or a combination of software/general purpose hardware and dedicated hardware. If embodied in dedicated hardware, each can be implemented as a circuit or state machine that employs any one of or a combination of a number of technologies. These technologies can include discrete logic circuits having logic gates for implementing various logic functions upon an application of one or more data signals, application specific integrated circuits (ASICs) having appropriate logic gates, field-programmable gate arrays (FPGAs), or other components.

The sequence diagram and flowcharts show examples of the functionality and operation of an implementation of portions of components described. If embodied in software, each block can represent a module, segment, or portion of code that can include program instructions to implement the specified logical function(s). The program instructions can be embodied in the form of source code that can include human-readable statements written in a programming language or machine code that can include numerical instructions recognizable by a suitable execution system such as a processor in a computer system or other system. The machine code can be converted from the source code. If embodied in hardware, each block can represent a circuit or a number of interconnected circuits to implement the specified logical function(s).

Although the sequence diagram and flowcharts show a specific order of execution, it is understood that the order of execution can differ from that which is depicted. For example, the order of execution of two or more blocks can be scrambled relative to the order shown. Also, two or more blocks shown in succession can be executed concurrently or with partial concurrence. Further, in some examples, one or more of the blocks shown in the drawings can be skipped or omitted.

Also, any logic or application described that includes software or code can be embodied in any non-transitory computer-readable medium for use by or in connection with an instruction execution system such as a processor in a computer system or other system. In this sense, the logic can include, for example, statements including instructions and declarations that can be fetched from the computer-readable medium and executed by the instruction execution system. In the context of the present disclosure, a "computer-readable medium" can be any medium that can contain, store, or maintain the logic or application described for use by or in connection with the instruction execution system.

The computer-readable medium can include any one of many physical media, such as magnetic, optical, or semiconductor media. More specific examples of a suitable computer-readable medium include solid-state drives or flash memory. Further, any logic or application described can be implemented and structured in a variety of ways. For example, one or more applications can be implemented as modules or components of a single application. Further, one or more applications described can be executed in shared or separate computing devices or a combination thereof. For example, a plurality of the applications described can execute in the same computing device, or in multiple computing devices.

It is emphasized that the above-described examples of the present disclosure are merely possible examples of implementations described for a clear understanding of the principles of the disclosure. Many variations and modifications can be made to the above-described examples without departing substantially from the spirit and principles of the disclosure. All such modifications and variations are intended to be included within the scope of this disclosure.

Therefore, the following is claimed:

1. A system, comprising:
a computing device comprising a processor and memory; and
program instructions stored in the memory that, when executed by the computing device, cause the computing device to at least:
authenticate an administrator identity;
receive a request to generate a device profile for a platform;
render a data driven user interface for configuring the device profile based at least in part on a definition file, the definition file comprising a plurality of platform parameters for configuring the device profile, rendering the data driven user interface comprises displaying a plurality of user interface elements that each correspond with one of the plurality of platform parameters;
receive user-input of a respective value for one of the plurality of user interface elements;
retrieve a plurality of values from the plurality of user interface elements;
generate the device profile based at least in part on a platform translation of the plurality of values;
determine a platform messaging service for communicating the device profile to a mobile device based at least in part on the platform; and
transmit a command to the platform messaging service to facilitate an installation of the device profile in the mobile device.

2. The system of claim 1, wherein the command to the platform messaging service further comprises instructing the platform messaging service to transmit a notification message to the mobile device, the notification message instructing the mobile device to retrieve the device profile from the computing device.

3. The system of claim 2, wherein the notification message comprises a uniform resource locator (URL) link for the mobile device to activate in order to retrieve the device profile from a command queue.

4. The system of claim 1, wherein transmitting the command to the platform messaging service to facilitate the installation of the device profile in the mobile device further comprises transmitting the device profile to the platform messaging service, wherein the command comprises instructing the platform messaging service to transmit the device profile to the mobile device and instruct the mobile device to install the device profile.

5. The system of claim 1, wherein each of the plurality of values is used to configure one of a plurality of platform features in the device profile.

6. The system of claim 1, wherein each of the plurality of platform parameters comprises a unique identifier among the plurality of platform parameters for a plurality of different platforms.

7. The system of claim 6, wherein the program instructions cause the computing device to generate the platform translation based at least in part on the unique identifier for each of the plurality of platform parameters.

8. The system of claim 1, wherein rendering the data driven user interface further comprises displaying a plurality of previous target values for some of the plurality of user interface elements, the plurality of previous target values being retrieved from a data store.

9. A non-transitory computer-readable medium embodying program instructions executable in a computing device that, when executed by the computing device, cause the computing device to at least:
authenticate an administrator identity;
receive a request to generate a device profile for a platform;
render a data driven user interface for configuring the device profile based at least in part on a definition file, the definition file comprising a plurality of platform parameters for configuring the device profile, rendering the data driven user interface comprises displaying a plurality of user interface elements that each correspond with one of the plurality of platform parameters;

receive user-input of a respective value for one of the plurality user interface elements;

retrieve a plurality of values from the plurality of user interface elements;

generate the device profile based at least in part on a platform translation of the plurality of values;

determine a platform messaging service for communicating the device profile to a mobile device based at least in part on the platform; and transmit a command to a platform messaging service to facilitate an installation of the device profile in a mobile device.

10. The non-transitory computer-readable medium of claim 9, wherein the command to the platform messaging service further comprises instructing the platform messaging service to transmit a notification message to the mobile device, the notification message instructing the mobile device to retrieve the device profile from the computing device.

11. The non-transitory computer-readable medium of claim 10, wherein the notification message comprises a uniform resource locator (URL) link for the mobile device to activate in order to retrieve the device profile from a command queue.

12. The non-transitory computer-readable medium of claim 9, wherein the command to the platform messaging service to facilitate the installation of the device profile in the mobile device further comprises transmitting the device profile to the platform messaging service, wherein the command comprises instructing the platform messaging service to transmit the device profile to the mobile device and instruct the mobile device to install the device profile.

13. The non-transitory computer-readable medium of claim 9, wherein each of the plurality of values is used to configure one of a plurality of platform features in the device profile.

14. The non-transitory computer-readable medium of claim 9, wherein the each of the plurality of platform parameters comprise a unique identifier among the plurality of platform parameters for a plurality of different platforms.

15. The non-transitory computer-readable medium of claim 14, wherein the program instructions cause the computing device to generate the platform translation based at least in part on the unique identifier for each of the plurality of platform parameters and the target platform.

16. A computer-implemented method, comprising:

authenticating, in a computing device, an administrator identity;

receiving, in the computing device, a request to generate a device profile for a platform;

rendering, in the computing device, a data driven user interface for configuring the device profile based at least in part on a definition file, the definition file comprising a plurality of platform parameters for configuring the device profile, rendering the data driven user interface comprises displaying a plurality of user interface elements that each correspond with one of the plurality of platform parameters;

receiving, in the computing device, user-input of a respective value for one of the plurality user interface elements;

retrieving, in the computing device, a plurality of values from the plurality of user interface elements;

generating, in the computing device, the device profile based at least in part on a platform translation of the plurality of values;

determining, in the computing device, a platform messaging service for communicating the device profile to a mobile device based at least in part on the platform; and transmitting, in the computing device, a command to the platform messaging service to facilitate an installation of the device profile in the mobile device.

17. The computer-implemented method of claim 16, wherein the command to the platform messaging service further comprises instructing the platform messaging service to transmit a notification message to the mobile device, the notification message instructing the mobile device to retrieve the device profile from the computing device.

18. The computer-implemented method of claim 17, wherein the notification message comprises a uniform resource locator (URL) link for the mobile device to activate in order to retrieve the device profile from a command queue.

19. The computer-implemented method of claim 16, wherein transmitting the command to the platform messaging service to facilitate the installation of the device profile in the mobile device further comprises transmitting the device profile to the platform messaging service, wherein the command comprises instructing the platform messaging service to transmit the device profile to the mobile device and instruct the mobile device to install the device profile.

20. The computer-implemented method of claim 16, wherein each of the plurality of values is used to configure one of a plurality of platform features in the device profile.

* * * * *